UNITED STATES PATENT OFFICE.

HENRY JAMES REES, OF LLANSAMLET, GLAMORGAN, WALES.

DEPOSITION OF METALLIC SALTS FROM SOLUTIONS CONTAINING THEM.

1,073,363.   Specification of Letters Patent.   Patented Sept. 16, 1913.

No Drawing.   Application filed September 19, 1912. Serial No. 721,314.

*To all whom it may concern:*

Be it known that I, HENRY JAMES REES, a subject of the King of England, residing at Llansamlet, Glamorgan, Wales, have invented certain new and useful Improvements in the Deposition of Metallic Salts from Solutions Containing Them, of which the following is a specification.

This invention is for improvements in or relating to the deposition of metallic salts from solutions containing them and has for its object the recovery of certain metallic salts from solutions by heating the latter under conditions hereinafter described.

The invention is a development from or an improvement on that described in my previous United States patent application Serial No. 644,798.

The present invention can be applied to the recovery of salts of copper, zinc, etc., but is especially applicable to solutions of sulfate of zinc or bisulfite and sulfate of zinc, such as those resulting from the treatment of roasted simple or complex ores of zinc with water and sulfurous acid.

In the process described in United States patent application Serial No. 644,798, a solution containing bisulfite and sulfate of zinc is made to flow filmwise over a series of plates or shelves heated to a high temperature, preferably by methods of internal heating whereby the solution is heated and the zinc salts are deposited therefrom more or less completely. This enables practically all the bisulfite of zinc to be precipitated as monosulfite of zinc, and allows a certain proportion of the zinc sulfate in solution to be precipitated; but in cases where the proportion of zinc sulfate in solution is comparatively high it is not always easy or economical to effect its precipitation by heating the solution to a temperature of say 80–90° C., and it is found necessary in order to effect complete recovery of the zinc sulfate, to concentrate the solution by actual evaporation until it reaches the crystallizing point.

According to this invention the method of effecting the precipitation of salts of zinc or copper from solutions of sulfate with or without sulfite consists in passing the solution in a continuously moving thin film over a plate heated to such a temperature as to evaporate the solution down to its crystallizing point. Thus, a process for treating complex sulfid ores for the extraction of zinc or copper therefrom according to this invention consists in roasting the ore to form metallic oxid and sulfate, treating the ore with sulfur dioxid in the presence of water to form solutions of bisulfite and sulfate, treating the whole solution according to United States patent application No. 644,798, splitting off a portion of the treated solution and passing it in a continuously moving thin film over a plate heated to such a temperature as to evaporate the solution down to its crystallizing point.

If a complex sulfid ore of zinc be subjected to a sulfating roast a comparatively large proportion of the zinc is converted into sulfate, the remainder being converted into oxid. The treatment of this product with water and sulfurous acid results in a practically complete extraction of the zinc, but the proportion of zinc sulfate in the solution is high. If this solution be subjected to the process described in my previous patent application Serial No. 644,798, practically all the bisulfite of zinc is removed from solution with some of the sulfate of zinc, but the resulting solution still contains zinc sulfate and if this solution be used repeatedly as a circuit liquor the zinc sulfate in solution accumulates. When there is about 10% as zinc sulfate in solution it interferes with the extraction of the zinc from the roasted ore and it is desirable therefore to keep the proportion of zinc sulfate in the circuit liquor below this figure. On the other hand it is not desirable to subject the whole of the solution to evaporation each time because the portion of zinc sulfate added in one operation is comparatively small. The object therefore of splitting off a portion of the liquor and evaporating it down to the crystallizing point is to remove from the circuit liquor as much zinc sulfate as has accumulated in the liquor from one operation, and the amount of liquid removed is made up by the addition of fresh water.

The following is a description by way of example of one method of carrying this invention into effect with a complex sulfid ore of zinc (containing say 30% of zinc) assuming that one hundred tons of ore are to be treated in twenty-four hours. The ore is subjected to a sulfating roast so as to convert say half of the zinc into zinc sulfate, the balance of the zinc, after such roasting being as oxid.

For one hundred tons of ore about five hundred tons of water are required. The ore member and a plow beam, of two knuckles to which said plow beam is pivotally attached, means adjustable parallel to the axis of the beam connecting one of said knuckles with said traveling member, and means adjustable vertically at right angles to the axis of the plow beam connecting the other knuckle with said traveling member.

6. In a plow structure of the character described, the combination with a traveling member having a diagonal rear end, a plow beam, and a brace projecting forwardly and laterally from said plow beam, of means adjustable parallel to the axis of the plow beam and affording a pivotal connection of the plow beam with the traveling member, and means adjustable vertically at right angles to the axis of the plow beam and affording pivotal connection of the brace with a traveling member, the pivotal connections of the plow beam and brace being in approximate horizontal alinement with each other.

7. In a plow structure of the character described, the combination with a traveling member and a plurality of plows, each provided with a laterally and forwardly projecting brace, of an angle beam secured to said traveling member at an angle to the direction of travel thereof, a bracket for each plow secured to said angle beam, a knuckle attached to each bracket and having pivotal connection with a plow beam and adjustable parallel to the axis of the latter, and a knuckle for each brace adjustable vertically at right angles to the axes of the plows and attached to said angle-beam, said last-mentioned knuckle having pivotal connection with the adjacent plow brace.

In testimony whereof, I have signed this specification in the presence of two subscribing witnesses.

WILLIAM L. PAUL.

Witnesses:
 DONALD A. HIMES,
 EDWIN NICAR.

---

Copies of this patent may be obtained for five cents each, by addressing the "Commissioner of Patents, Washington, D. C."

mainder to be mixed with a fresh quantity of the original solution, and submitting the split-off portion to a further treatment for the removal of the remaining sulfate.

7. The hereindescribed process for depositing monosulfite and sulfate of a metal from solutions containing bisulfite and sulfate of the metal which consists in forming a continuously moving thin film of the solution, passing it over a heated surface and submitting to the action of hot gases from a coke fire for the removal of the monosulfite and some sulfate, splitting off a portion of the thus treated solution, returning the remainder to be mixed with a fresh quantity of the original solution, and submitting the split-off portion to a further treatment for the removal of the remaining sulfate.

8. The hereindescribed process for depositing monosulfite and sulfate of a metal from solutions containing bisulfite and sulfate of the metal which consists in forming a continuously moving thin film of the solution, passing it over a number of heated surfaces in cascade and submitting it to the action of hot gases from a coke fire, for the removal of the monosulfite and some sulfate, splitting off a portion of the thus treated solution, returning the remainder to be mixed with a fresh quantity of the original solution and submitting the split-off portion to a further treatment for the removal of the remaining sulfate.

9. The hereindescribed process for depositing monosulfite and sulfate of zinc from a solution containing bisulfite and sulfate of zinc which consists in treating the solution first for the removal of the monosulfite and some sulfate, thereafter splitting off a portion of the treated solution, returning the remainder to be mixed with a fresh quantity of the original bisulfite solution and submitting the split-off portion to a further treatment for the removal of the remaining sulfate.

10. The hereindescribed process for depositing monosulfite and sulfate of zinc from solutions containing bisulfite and sulfate of zinc which consists in subjecting a continuously moving thin film of the solution to the action of heat for the deposition of the monosulfite and some sulfate, thereafter splitting off a portion of the treated solution, returning the remainder to be mixed with a fresh quantity of the original bisulfite solution and submitting the split-off portion to a further treatment for the removal of the remaining sulfate.

11. The hereindescribed process for depositing monosulfite and sulfate of zinc from a solution containing bisulfite and sulfate of zinc which consists in forming a continuously moving thin film of the solution and passing it over a number of heated surfaces in cascade to deposit the monosulfite and some sulfate, thereafter splitting off a portion of the treated solution, returning the remainder to be mixed with a fresh quantity of the original bisulfite solution and submitting the split-off portion to a further treatment for the removal of the remaining sulfate.

12. The hereindescribed process for depositing monosulfite and sulfate of zinc from a solution containing bisulfite and sulfate of zinc which consists in forming a continuously moving thin film of the solution, passing it over a number of heated surfaces in cascade and submitting it to the action of hot gases from a coke fire to bring about the deposition of the monosulfite and some sulfate, thereafter splitting off a portion of the treated solution, returning the remainder to be mixed with a fresh quantity of the original bisulfite solution, and submitting the split-off portion to a further treatment for the removal of the remaining sulfate.

In testimony whereof I have signed my name to this specification in the presence of two subscribing witnesses.

HENRY JAMES REES.

Witnesses:
L. L. HARRIS,
WYANSELL VAUGHAN WILLIAMS.